(12) United States Patent
Benda

(10) Patent No.: US 7,293,438 B2
(45) Date of Patent: Nov. 13, 2007

(54) CABLE LOCKOUT ASSEMBLY

(75) Inventor: Steven J. Benda, Cokato, MN (US)

(73) Assignee: Brady Worldwide, Inc., Milwaukee, WI (US)

( * ) Notice: Subject to any disclaimer, the term of this patent is extended or adjusted under 35 U.S.C. 154(b) by 102 days.

(21) Appl. No.: 10/927,686

(22) Filed: Aug. 27, 2004

(65) Prior Publication Data

US 2006/0042329 A1    Mar. 2, 2006

(51) Int. Cl.
*F16G 11/00* (2006.01)
*E05B 73/00* (2006.01)

(52) U.S. Cl. ............... 70/18; 70/14; 70/49; 70/58; 24/132 WL; 24/134 R

(58) Field of Classification Search ............ 70/18, 70/19, 49, 14, 16–17, 30, 43, 58, 259–260, 70/233, 461; 24/132 R, 134, 132 WL, 71.1, 24/134 L, 134 R, 134 KB
See application file for complete search history.

(56) References Cited

U.S. PATENT DOCUMENTS

| | | | |
|---|---|---|---|
| 2,722,449 A | 11/1955 | Harley | |
| 3,017,678 A * | 1/1962 | Christensen | 24/134 R |
| 3,824,653 A * | 7/1974 | Sholler | 24/134 KB |
| 3,967,349 A | 7/1976 | Christensen | |
| 4,470,501 A | 9/1984 | Wilson | |
| 4,536,921 A * | 8/1985 | Brendel et al. | 24/132 WL |
| 4,669,582 A | 6/1987 | Sandreid | |
| 4,747,631 A * | 5/1988 | Loynes et al. | 292/307 R |
| 4,878,270 A | 11/1989 | Westerkamp | |
| 4,912,817 A * | 4/1990 | Sandreid | 24/132 R |
| 5,083,350 A * | 1/1992 | Sandreid | 24/134 R |
| 5,222,776 A | 6/1993 | Georgopoulos et al. | |
| 5,517,835 A * | 5/1996 | Smith | 70/14 |
| 5,531,297 A * | 7/1996 | Pipan | 188/65.1 |
| 5,823,020 A | 10/1998 | Benda | |
| 6,948,594 B2 * | 9/2005 | Hossler | 188/65.1 |
| 2003/0046852 A1 | 3/2003 | Burmesch | |

FOREIGN PATENT DOCUMENTS

| | | |
|---|---|---|
| EP | 0 424 307 A2 | 4/1991 |
| EP | 0 861 994 A2 | 9/1998 |
| GB | 2 086 547 A | 5/1982 |

OTHER PUBLICATIONS

European Search Report dated Dec. 19, 2005.

* cited by examiner

*Primary Examiner*—Jennifer H. Gay
*Assistant Examiner*—Christopher Boswell
(74) *Attorney, Agent, or Firm*—Quarles & Brady LLP

(57) ABSTRACT

A cable lockout assembly includes a cable sizing mechanism coupled to a cable clamping mechanism. The cable sizing mechanism is coupled with the cable clamping mechanism for adjusting the cable clamping mechanism relative to a size of the cable.

22 Claims, 8 Drawing Sheets

CABLE LOCKOUT ASSEMBLY

CROSS REFERENCES TO RELATED APPLICATIONS

Not Applicable.

STATEMENT REGARDING FEDERALLY SPONSORED RESEARCH

Not Applicable

BACKGROUND OF THE INVENTION

The present invention relates to cable lockout assemblies, and more particularly to a cable lockout assembly that can accommodate cables of different diameters.

It is often desirable to secure various components of an apparatus in a single locked orientation. For example, many factories will include a plurality of large gate valves for controlling high pressure fluid or gas. Manufacturing processes may require ON, OFF, or partially ON gate valves and, improperly adjusted valves may either damage or destroy factory machinery, adversely affect manufacturing processes, or cause safety problems. Other applications where apparatus are advantageously locked in a single orientation include vehicle steering wheels while vehicles are parked, large circuit breakers and cylindrical gas tanks that are often stored in factories, hospitals and restaurants, to name a few.

In each of these applications, the industry has devised various locking mechanisms. One particular mechanism includes a cable and a cable locking mechanism whereby one cable end is secured to the mechanism and the other cable end can be fixed relative to the mechanism forming a loop. Mechanisms using this technique can provide a tight locking loop and, because a long cable can be provided to accommodate any size requirements, these mechanisms are versatile.

The particular size, i.e. diameter, of the cable used with the cable locking mechanism is typically determined by the application in which the cable and locking mechanism is used. In an application in which the cable must pass through small holes, a small cable diameter, such as 0.125 inches or less, may be desired. In other applications, where there is a concern that the cable may be cut by an unauthorized user, a large cable diameter, such as 0.25 inches or more, may be desired.

In order to provide the proper clamping force on the cable, known locking mechanisms are designed for a single cable size. If an undersized cable is used in a locking mechanism, the clamping force exerted on the cable by the locking mechanism may be insufficient to properly secure the cable relative to the locking mechanism. Likewise, if an oversized cable is forced through a locking mechanism the clamping mechanism may not be able to properly clamp onto the cable, or the cable mechanism may be damaged. Thus, it would be advantageous to have a cable locking mechanism that can accommodate various sizes of cable.

BRIEF SUMMARY OF THE INVENTION

The present invention provides a cable lockout assembly including a cable sizing mechanism coupled to a cable clamping mechanism. The cable sizing mechanism coupled with the cable clamping mechanism adjusts the cable clamping mechanism relative to a size of the cable.

A general objective of the present invention is to provide a cable lockout assembly that can accommodate cables having different diameters. This objective is accomplished by providing a cable lockout assembly including a cable sizing mechanism coupled to a cable clamping mechanism, wherein the cable sizing mechanism adjusts the cable clamping mechanism in relation to the cable diameter.

The foregoing and other objects and advantages of the invention will appear from the following description. In the description, reference is made to the accompanying drawings which form a part hereof, and in which there is shown by way of illustration a preferred embodiment of the invention.

DETAILED DESCRIPTION OF THE PREFERRED EMBODIMENTS

Figure 1:
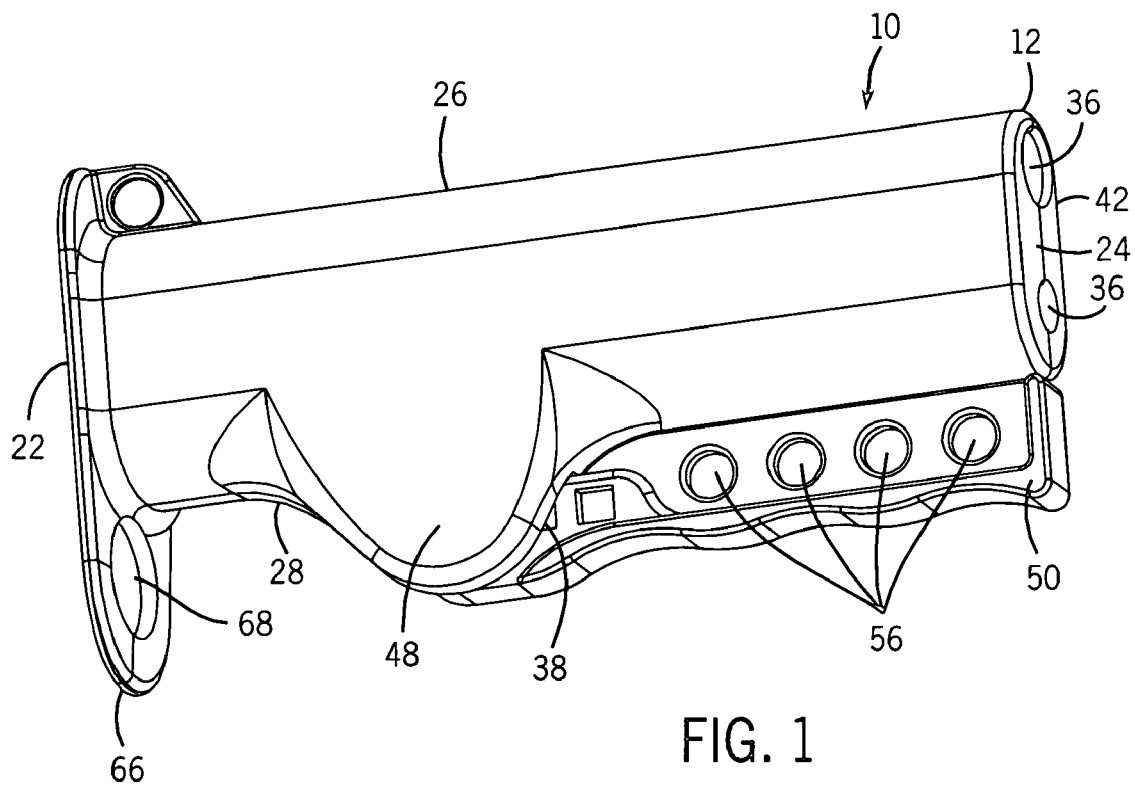
FIG. 1 is a rear, side perspective view of a cable lockout assembly incorporating the present invention.
Figure 2:
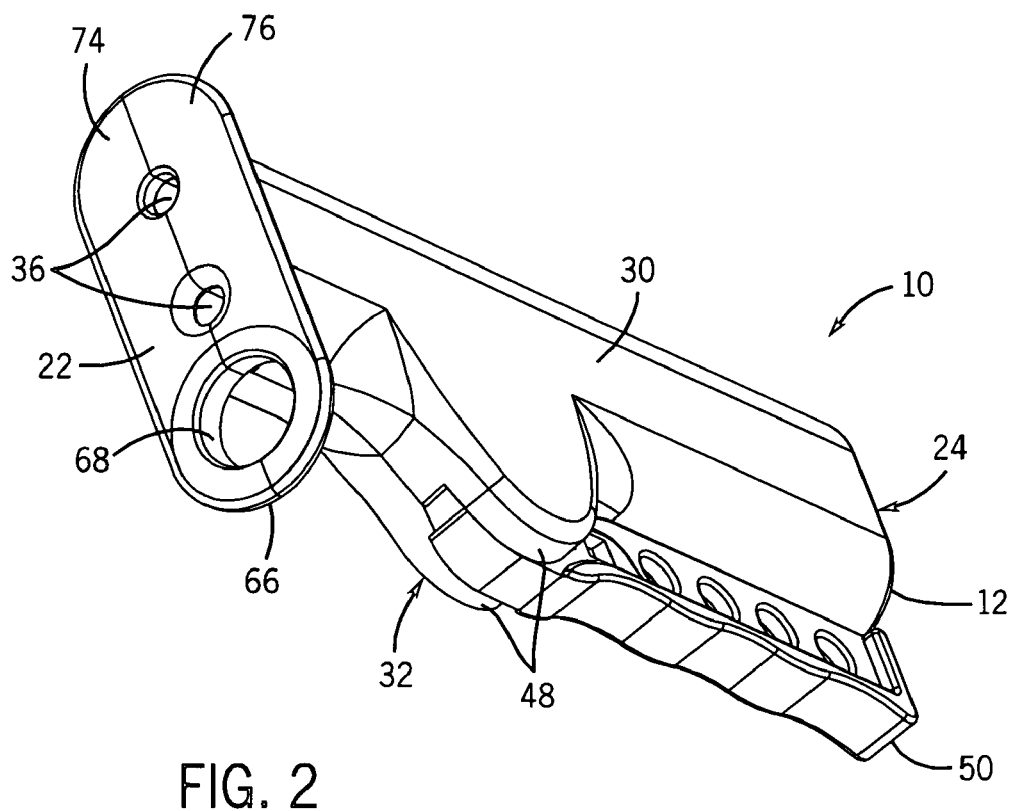
FIG. 2 is a bottom, front perspective view of the cable lockout assembly of FIG. 1.

Referring to FIGS. 1-8, a cable lockout assembly 10 includes a body 12 that secures a cable 14 which can be used to lock out equipment. The equipment can be any type of mechanical or electrical machinery that can be locked out by strategically securing the cable 14 thereto. Advantageously, the cable lockout assembly 10 accommodates a range of cable diameters by having a cable sizing mechanism 16 coupled to a cable clamping mechanism 18. The cable sizing mechanism 16 engages the cable 14 to adjust the cable clamping mechanism 18 for the diameter of the cable 14 being used, such that the cable clamping mechanism 18 applies substantially the same force on the cable 14 regardless of the cable diameter.

The cable 14 can be any type cable, such as a sheathed or bare multi-strand stainless steel or galvanized metal, a solid nylon cable, and the like. Preferably, the cable diameter ranges between 0.125 and 0.25 inches. However, a cable lockout assembly incorporating the present invention which can accommodate a larger range of cable diameter can be designed by one skilled in the art without departing from the scope of the invention.

The body 12 is substantially rectangular having opposing ends 22, 24 joined by upper and lower edges 26, 28 and sides 30, 32. The body 12 defines a discontinuous cable passageway 36 including a cable sizing passageway 38 and a cable clamping passageway 40. The cable sizing passageway 38 extends between the body ends 22, 24. A receptacle 42 formed in the rearward end of the cable sizing passageway 38 receives an anchor 44 fixed to one end of the cable 14. The anchor 44 is received in the receptacle 42 to anchor the one end of the cable 14 to the body 12. The cable clamping passageway 40 is substantially parallel to the cable sizing passageway 38, and extends between the body ends 22, 24.

An ear 48 extending away from the lower body edge 28 pivotally supports a lever, or handle 50. A handle wrist pin 52 mounted in the ear 48 between pin stubs 54 extending inwardly into the body 12 from each body side 30, 32 pivotally mounts the handle 50 relative to the body 12. The handle 50 is pivotally moveable between a clamped position (shown in FIG. 1) and an open position. In the clamped position, the handle 50 is substantially parallel to the lower body edge 28 against the body lower edge 28. In the open position, the handle 50 defines an angle, such as 90°, with the body lower edge 28. The handle 50 includes a plurality of holes 56 for receiving the hasp of a locking mechanism (not shown), such as a padlock.

A lock plate 60 extending downwardly away from the lower body edge 28 rearward of the ear 48 includes a plurality of holes 62. The holes 62 in the lock plate 60 are aligned with the plurality of holes 56 in the handle 50 when the handle 50 is in the clamped position. A user can insert the hasp of the locking mechanism through one aligned pair of aligned lock plate and handle holes 62, 56 to lock the handle 50 in the clamped position.

A flange 66 formed at the forward end 22 of the body 12 extends past the body 12, and includes a hole 68 which can receive unused, or excess cable 14, to secure the free end 72 of the cable 14 when the cable lockout assembly 10 is in use. Advantageously, by providing a means to secure the excess cable 14 while the cable lockout assembly 10 is in use, the excess cable 14 is out of the way for anyone working on the equipment locked out by the cable lockout assembly 10.

Preferably, the body 12 is split along a plane extending through the body edges 26, 28 and ends 22, 24 to form a first body half 74 and a second body half 76. In the embodiment disclosed herein, the plane is offset from the center of the body 12 resulting in the lock plate 60 extending from only the first body half 74. Of course, the plane can be offset further from the body center, such that second body half 76 serves to merely cover an opening in the first body half 74. Likewise, the plane can coincide with the body center longitudinally splitting both the ear 48 and lock plate 60 without departing from the scope of the invention.

The body halves 74, 76 are formed from molded plastic which are joined together to form the body 12. Preferably, the two body halves 74, 76 are bonded together, such as by adhesives, ultrasonic welding, and the like, to prevent an unauthorized user from disassembling the cable lockout assembly 10 to release the cable 14. Of course, the body halves 74, 76 can be joined together by nuts and bolts received through holes formed through the body half sides. Plugs urged into each hole open end covering the nuts and bolts can be used to discourage an unauthorized user from circumventing the cable lock assembly.

Figure 3:
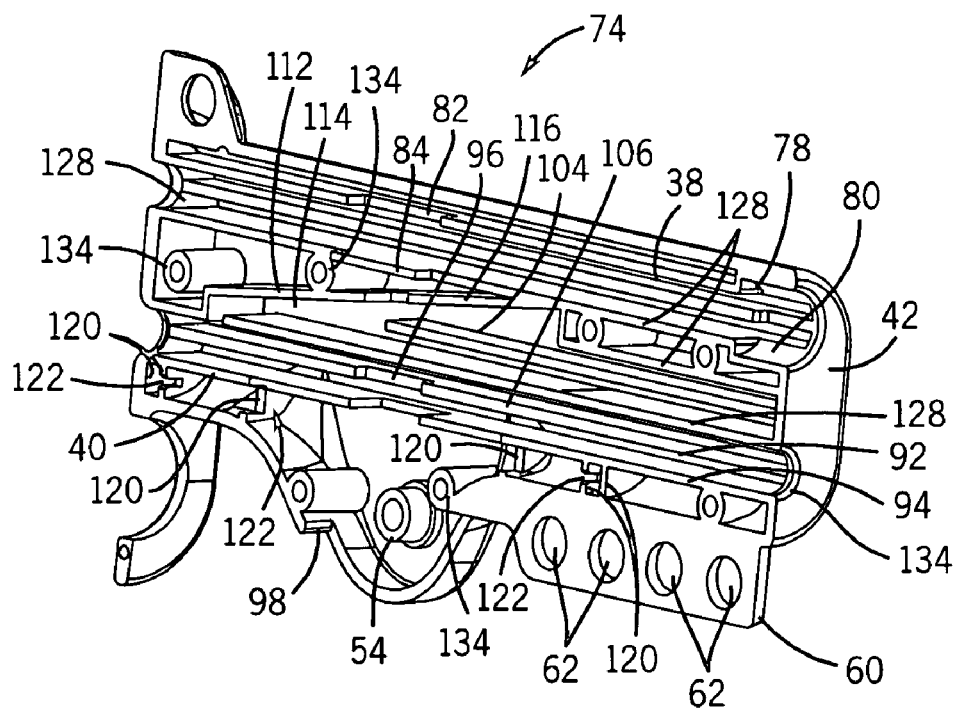
FIG. 3 is a rear perspective view of one half of the body of FIG. 1.
Figure 6:
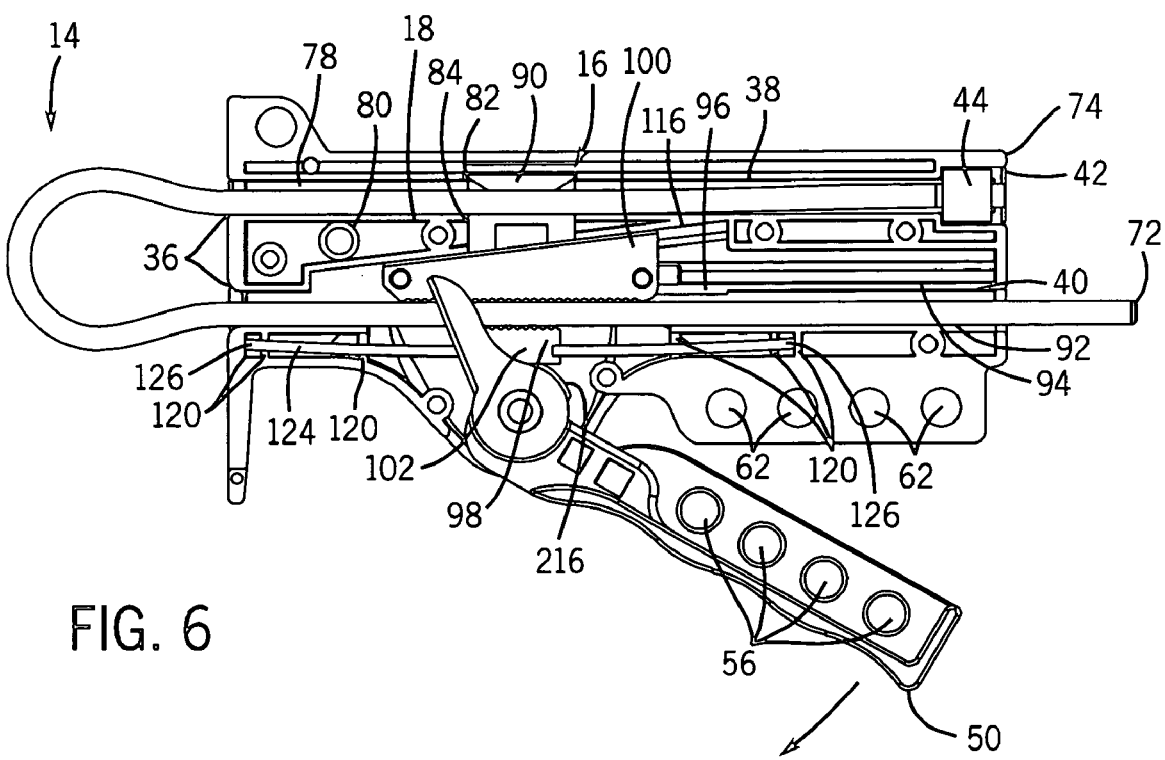
FIG. 6 is a side view of the cable lockout assembly of FIG. 1 with the second body half removed, and the handle moved toward the open position.
Figure 7:
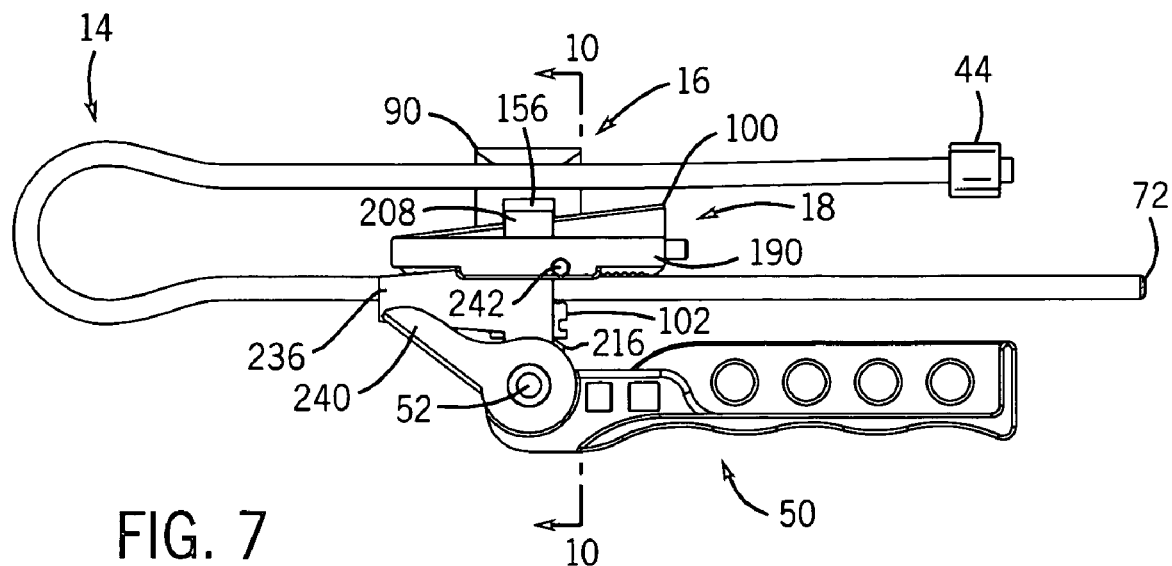
FIG. 7 is a side view of the cable lockout assembly with both body halves removed.
Figure 8:
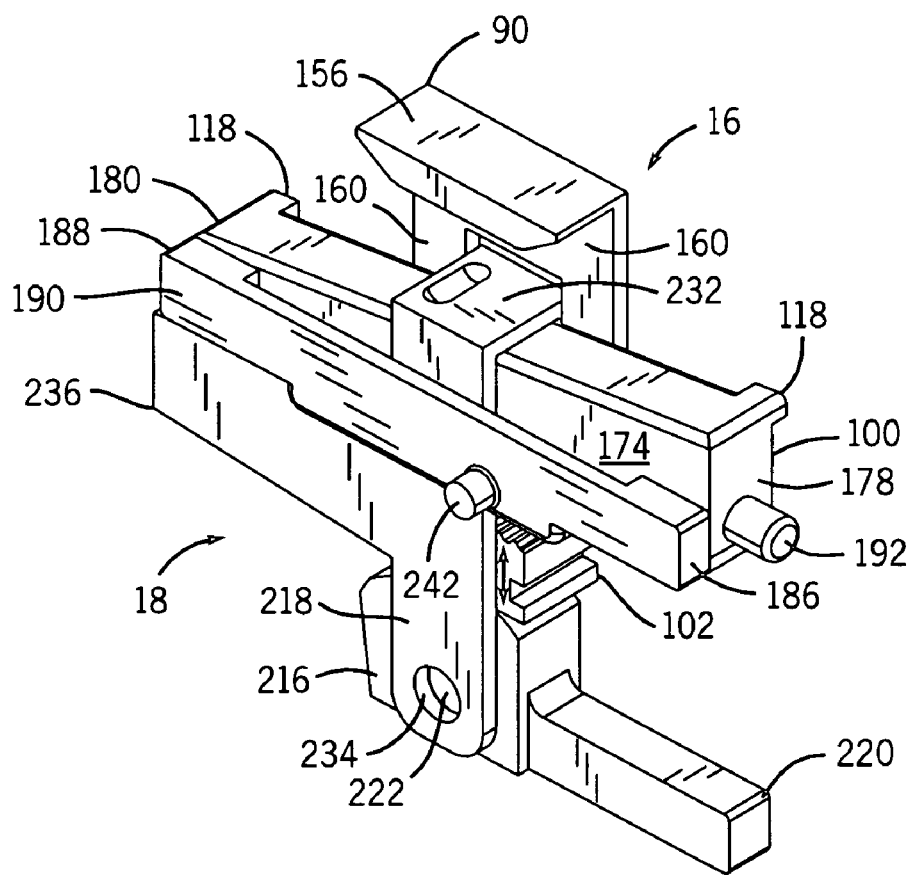
FIG. 8 is a rear perspective view of the cable sizing mechanism and cable clamping mechanism of FIG. 7.
Figure 9:
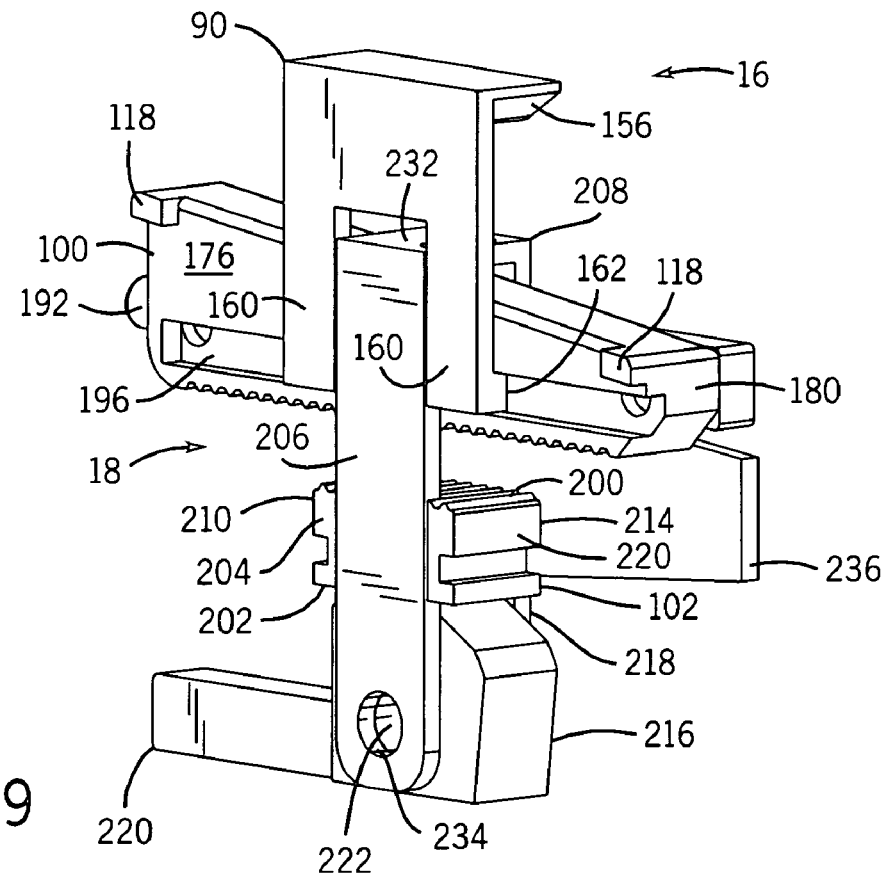
FIG. 9 is a front perspective view of the cable sizing mechanism and cable clamping mechanism of FIG. 7.
Figure 10:
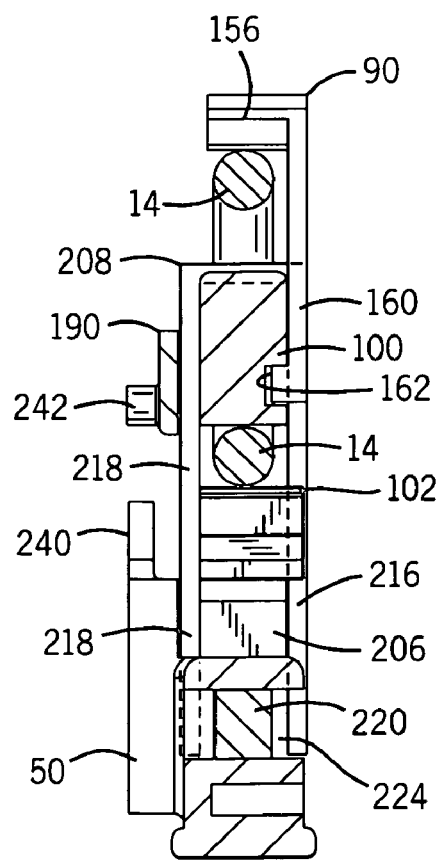
FIG. 10 is a cross sectional view along line 10-10 of FIG. 7.
Figure 11:
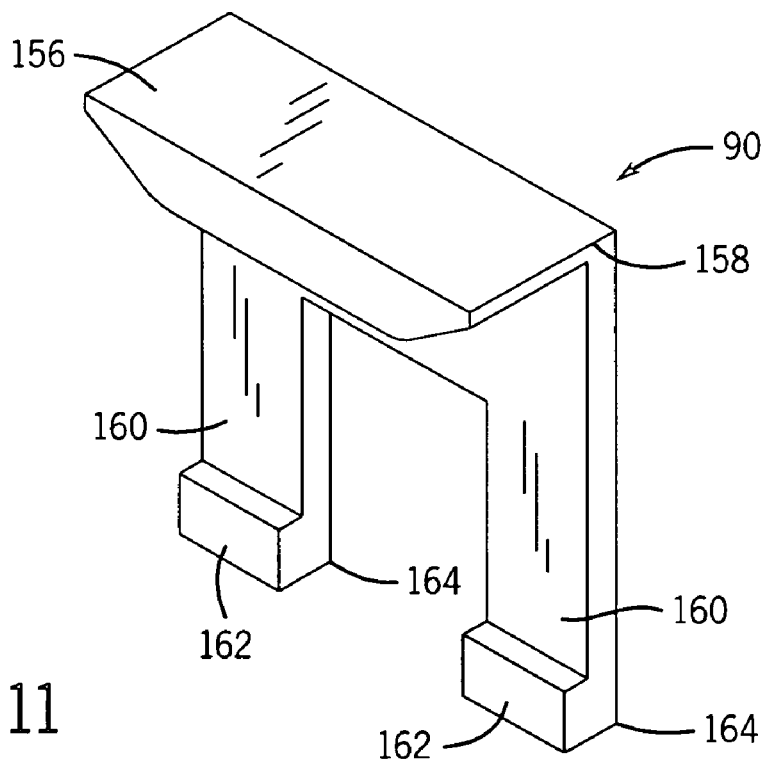
FIG. 11 is a perspective view of the gage plate of FIG. 7.
Figure 12:
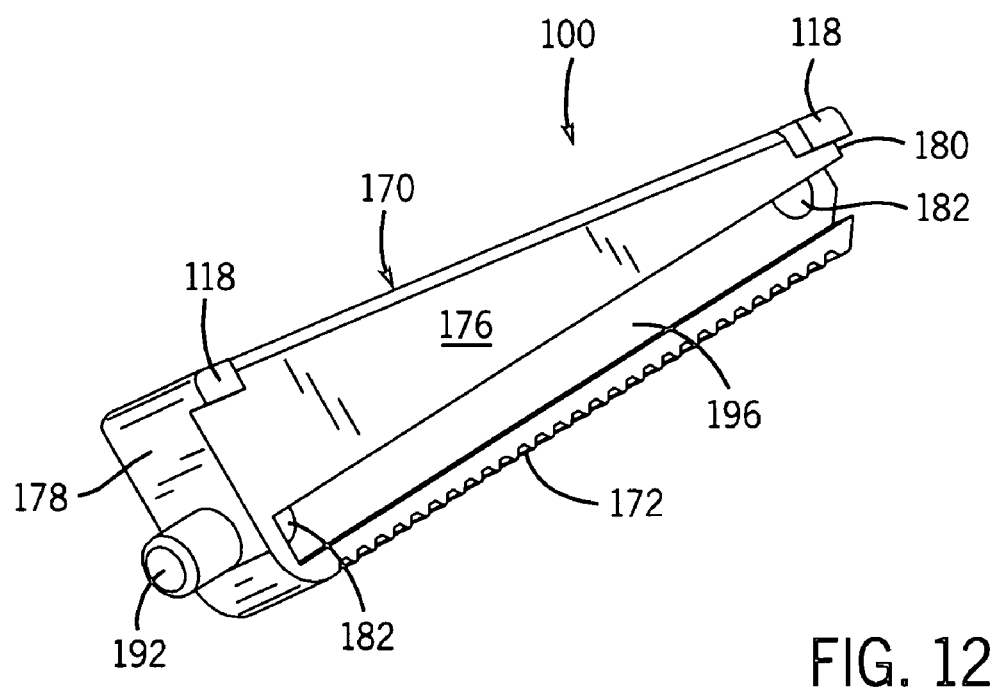
FIG. 12 is a perspective view of the adjustable cleat of FIG. 7.
Figure 13:
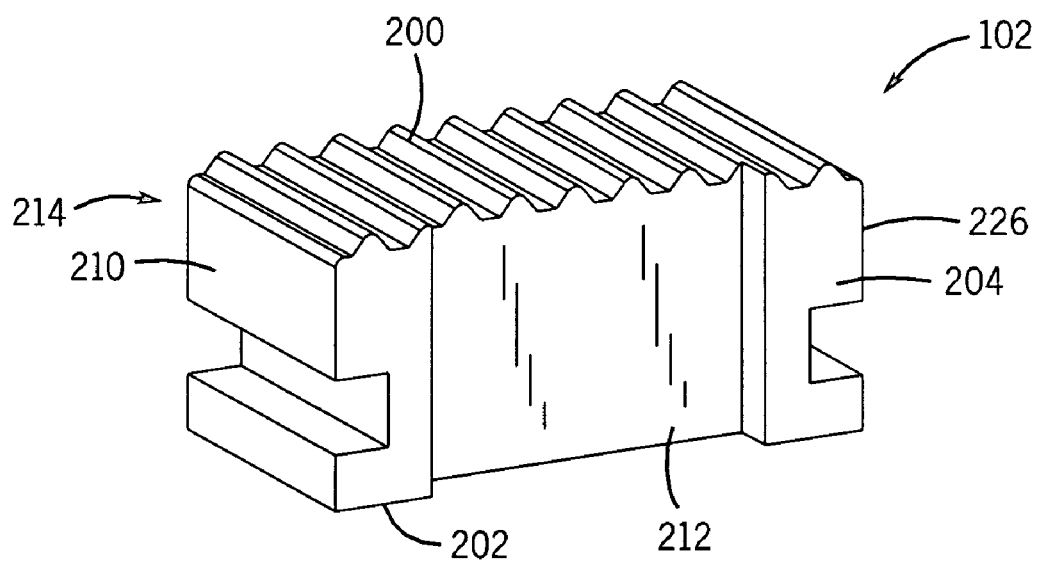
FIG. 13 is a perspective view of the clamp cleat of FIG. 7.
Figure 14:
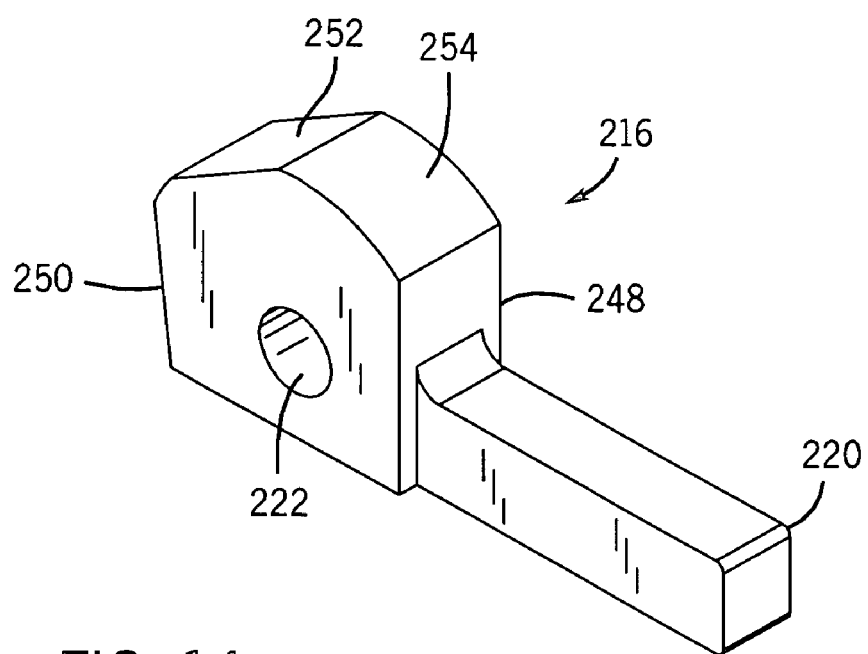
FIG. 14 is a perspective view of the cam of FIG. 7.
Figure 15:
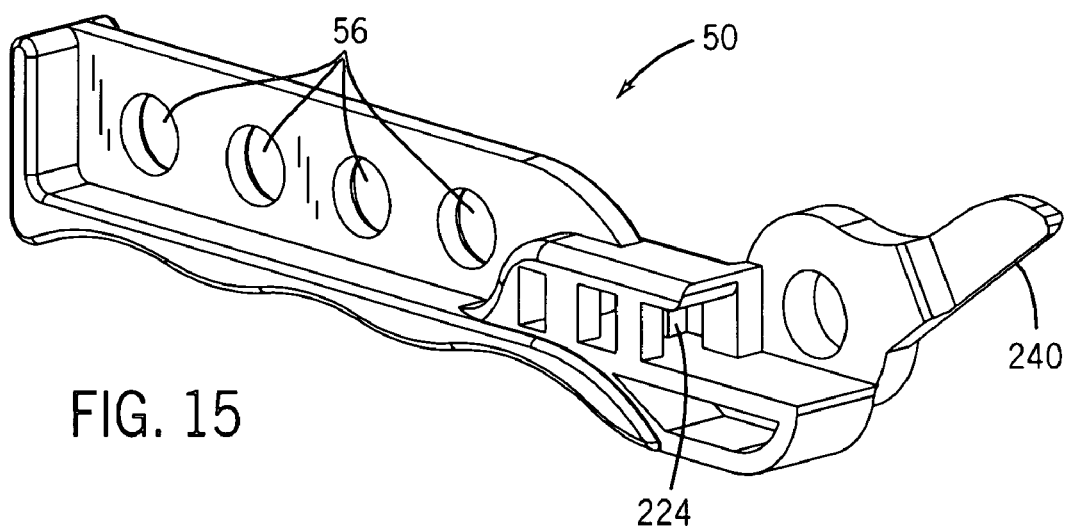
FIG. 15 is a perspective view of the handle of FIG. 7.
Figure 16:
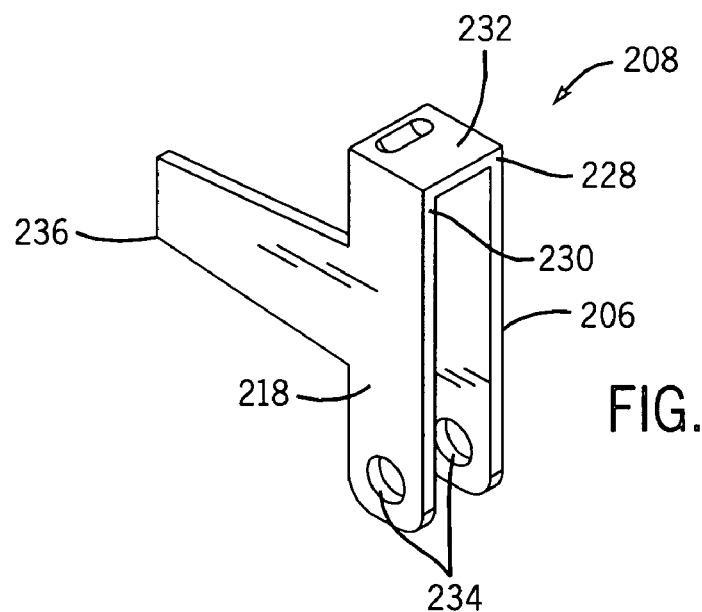
FIG. 16 is a perspective view of the cam mounting clip of FIG. 7.
Figure 17:
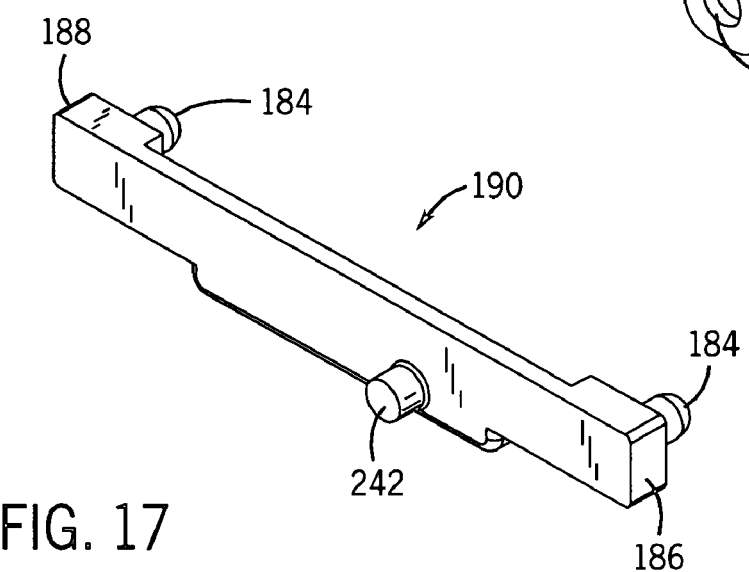
FIG. 17 is a perspective view of the cleat plate of FIG. 7.

Referring to FIGS. 1, 3, and 6, the first body half 74 includes a first pair of upper and lower longitudinally extending parallel ribs 78, 80 that define the cable sizing passageway 38. A break 82, 84 in each rib receives a gage plate 90 forming part of the cable sizing mechanism 16. A second pair of upper and lower longitudinally extending parallel ribs 92, 94 are spaced from, and substantially parallel to the first pair of longitudinally extending ribs 78, 80, The second pair of longitudinally extending ribs 92, 94 define the cable clamping passageway 40. A break 96, 98 in each rib 92, 94 defining the cable clamping passageway 40 receive one of an adjustable cleat 100 and a clamp cleat 102 forming part of the cable clamping mechanism 18.

A third pair of longitudinally extending parallel ribs 104, 106 disposed between the first and second pair of ribs 78, 80, 92, 94 extend rearwardly from the cable clamping mechanism 18 to form an adjustable cleat biasing member receptacle 108. The adjustable cleat biasing receptacle 108 receives an adjustable cleat biasing member 110 (shown in FIG. 5), such as a helical compression spring, acting on the adjustable cleat 100.

A pair of parallel ribs 112, 114 extending diagonally between the first and second pair of ribs 78, 80, 92, 94 and forward of the third pair of longitudinally extending parallel ribs 104, 106 define a diagonal guide track 116. The guide track 116 receives guide posts 118 (shown in FIG. 5) extending transversely from the adjustable cleat 100. The posts 118 slidably move in the diagonal guide track 116 to guide the adjustable cleat 100 along a diagonal path in relation to the size of the cable 14 received in the cable sizing passageway 38.

Five vertical ribs 120 are longitudinally spaced along the lower edge 28 of the body 12 between the second pair of ribs 92, 94 and the lower edge 28 of the body 12 from one end 22 of the body 12 past the lower break 98 in the second pair of ribs 92, 94. A notch 122 in each of the first four vertical ribs 120 spaced from the forward end 22 of the body 12 receives a clamp cleat biasing member 124, such as a leaf spring, that biases the clamp cleat 102 downwardly away from the adjustable cleat 100. The one end 22 of the body 12 and unnotched transverse rib 120 engage ends 126 of the biasing member 124 to maintain the biasing member 124 aligned with the lower break 98 in the second pair of ribs 92, 94 by preventing the clamp cleat biasing member 124 from sliding longitudinally.

Figure 4:
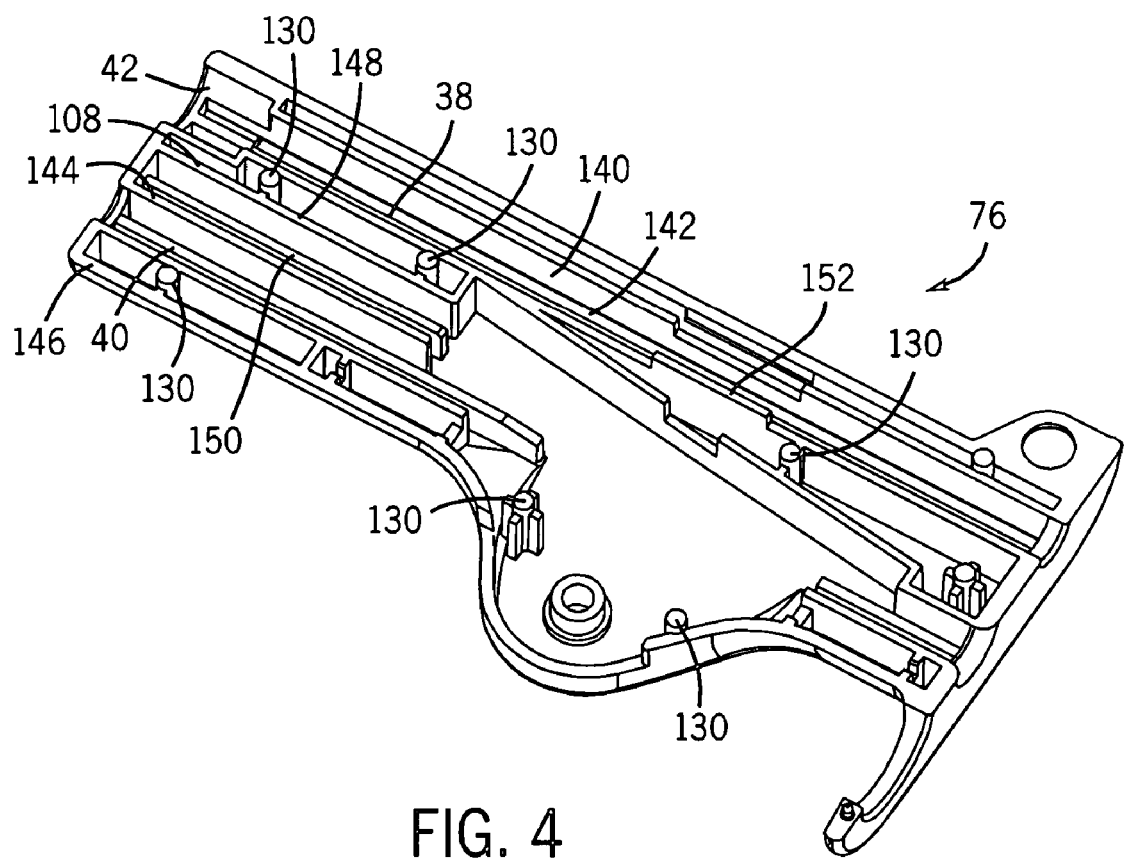
FIG. 4 is a front perspective view of the other half of the body of FIG. 1.
Figure 5:
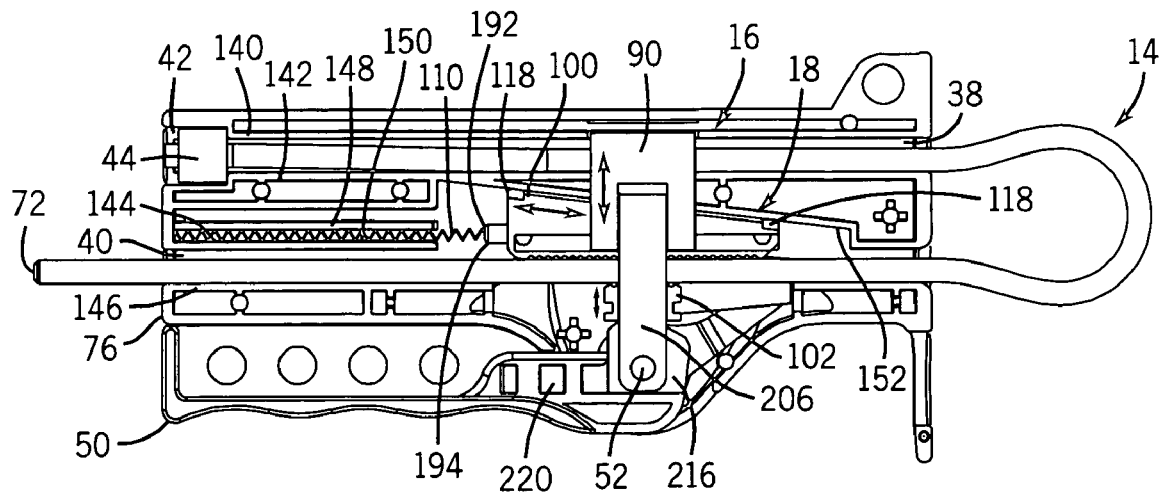
FIG. 5 is a side view of the cable lockout assembly of FIG. 1 with the first body half removed, and the handle in the clamp position.

As shown in FIGS. 3 and 4, additional ribs 128 formed in the first body half 74 can be provided to stiffen the first body half 74. In addition, receptacles 134 formed in the first body half 74 receive guide posts 130 extending inwardly from the second body half 76 align the body halves 74, 76 during assembly.

Referring to FIGS. 3-6, the second body half 76 (shown in FIGS. 4 and 5) includes ribs 140, 142, 144, 146, 148, 150 corresponding to, and aligned with the longitudinally extending ribs formed in the first body half 74. Inner edges of the longitudinally extending ribs 78, 80, 92, 94, 104, 106 formed in the first body half 74 abut the inner edges of the corresponding ribs 140, 142, 144, 146, 148, 150 of the second body half 76 to define the cable sizing passageway 38, cable clamping passageway 40, and adjustable cleat biasing member receptacle 108. A single diagonal rib 152 formed in the second body half 76 corresponds to the upper rib 112 of the diagonal ribs 112, 114 formed in the first body half 74, and includes an inner edge abutting the corresponding rib 112 of the first body half 74.

As shown in FIGS. 6-11, the cable sizing mechanism 16 includes the moveable gage plate 90 slidably received in the breaks 82, 84 formed in the longitudinally extending parallel ribs 78, 80 that define the cable sizing passageway 38. The moveable gage plate 90 is vertically moveable between an open position and a sizing position. In the sizing position, the moveable gage plate 90 is tight against the cable 14 disposed in the cable sizing passageway 38 to size the cable 14 and adjust the cable clamping mechanism 18 for the particular size, or diameter, cable in the cable passageway 36. In the open position, the gage plate 90 is urged above the cable sizing passageway 38 to allow inserting the cable 14 into the cable sizing passageway 38.

The L-shaped gage plate 90 has an engagement arm 156 joined at one side 158 to a pair of downwardly extending legs 160. The engagement arm 156 extends over the cable sizing passageway 38 and engages the cable 14 disposed therein when the gage plate 90 moves toward the sizing position. A coupling post 162 extending transversely from a distal end 164 of each leg 160 engages the adjustable cleat 100 of the clamping mechanism 18 to position the adjustable cleat 100 relative to the cable size, such that the cable clamping mechanism 18 applies the substantially same force on the cable 14 regardless of the cable diameter.

The cable clamping mechanism 18 is mounted in the body 12 and includes the adjustable cleat 100 and clamp cleat 102 mounted above and below the cable clamping passageway 40, respectively. The adjustable cleat 100 extends downwardly through the break 96 of the upper rib 92 of the second pair of longitudinally extending parallel ribs 92, 94 forming the cable clamping passageway 40 to impinge on the cable 14 disposed therein. Likewise, the clamp cleat 102 extends upwardly through the break 98 of the lower rib 94 of the second pair of longitudinally extending parallel ribs 92, 94 forming the cable clamping passageway 40 to impinge on the cable 14 disposed therein. The opposing cleats 100, 102 clamp the cable 14 therebetween to fix the section of cable 14 in the cable clamping passageway 40 relative to the body 12.

The adjustable cleat 100 is moveably mounted in the body 12 adjacent the cable clamping passageway 40 between a forward position and a rearward position. In the forward position, the adjustable cleat 100 is clear of the cable clamping passageway 40 to allow the cable 14 to be inserted therethrough. In the rearward position, the adjustable cleat 100 is positioned to clamp onto the minimum diameter cable 14 receivable in the cable clamping passageway 40. The adjustable cleat biasing member 110 (shown in FIG. 5) engages the adjustable cleat 100 and urges the adjustable cleat 100 forwardly toward the forward position to urge the gage plate 90 downwardly toward the gage plate sizing position.

As shown in FIGS. 5-10, 12, and 17, the adjustable cleat 100 includes an upper surface 170 and a lower surface 172 joined by first and second opposing sides 174, 176 and first and second opposing ends 178, 180. The upper surface 170 defines an acute angle with the lower surface 172 which is serrated for engaging the cable 14 disposed in the cable clamping passageway 40. Apertures 182 formed proximal each end 178, 180 of the adjustable cleat 100 receive posts 184 extending transversely from each end 186, 188 of a cleat plate 190. The posts 184 rigidly fix the cleat plate 190 relative to the adjustable cleat 100, such that the cleat plate 190 moves with the adjustable cleat 100 as the adjustable cleat 100 slidably moves between the rearward and forward positions. A biasing member retention post 192 extending rearwardly from the first end 178 of the adjustable cleat 100 fixes an end 194 of the adjustable cleat biasing member 110 to the adjustable cleat 100.

The adjustable cleat 100 is guided along the diagonal track 116 by the guide posts 118 extending transversely from the first side of the adjustable cleat 100 into the diagonal track 116. Preferably, the guide posts 118 are evenly spaced from, and proximal, the upper surface 170. Advantageously, the upper surface 170 defines an acute angle with the lower surface 172, such that guide posts 118 guide the adjustable cleat 100 diagonally along the diagonal track 116 while maintaining the lower surface 172 of the adjustable cleat 100 substantially parallel to the cable clamping passageway 40.

A longitudinal slot 196 formed in the second side 176 of the adjustable cleat 100 receives the gage plate coupling posts 162 to couple the gage plate 90 to the adjustable cleat 100. The slot 196 allows the adjustable cleat 100 to move diagonally between the forward and rearward positions as the gage plate 90 moves vertically between the open position and sizing position. Advantageously, when the gage plate 90 engages the cable 14 in the cable passageway 36, the adjustable cleat 100 is prevented from moving further toward the rearward position by the gage plate coupling posts 162 received in the longitudinal slot 196. As a result, the gage plate 90 positions the adjustable cleat 100 relative to the cable 14 received in the cable clamping passageway 40 in relation to the size of the cable 14, such that the cable clamping mechanism 18 applies substantially the same force on the cable 14 regardless of the cable diameter.

The clamp cleat 102 shown in FIGS. 6-10 and 13 is opposed to the adjustable cleat 100 on the opposite side of the cable clamping passageway 40, and includes an upper surface 200 and lower surface 202 joined by sides 204, 214 and ends 226, 210. The clamp cleat upper surface 200 is serrated for engaging the cable 14 disposed in the cable clamping passageway 40. A vertical slot 212 formed in one side 204 of the clamp cleat 102 receives a guide leg 206 forming part of a cam mounting clip 208 which guides the clamp cleat 102 between an open position and a closed position. The lower surface 202 of the clamp cleat 102 engages a cam 216 which urges the clamp cleat 102 between the open position and a closed position.

The clamp cleat 102 is vertically moveably mounted between the open position and a clamping position in the body 12 adjacent to the cable clamping passageway 40 in an opposing relation to the adjustable cleat 100 for engaging the cable 14. In the open position, the clamp cleat upper surface 200 is disposed beneath the cable clamping passageway 40 in the break 98 (shown in FIG. 3) in the lower rib 94 of the second pair of ribs 92, 94 to allow threading the cable 14 through the cable clamping passageway 40 unobstructed. In the clamping position, the clamp cleat 102 extends into the cable clamping passageway 40 to securely engage the clamp cleat upper surface 200 with the cable 14 disposed in the cable clamping passageway 40.

The cam 216 shown in FIGS. 6-10 and 14 is pivotally mounted beneath the clamp cleat 102 between the legs 206, 218 of the cam mounting clip 208, and includes a body 248 with a rearwardly extending lever arm 220. The body 248 has three camming surfaces, an open camming surface 250, an intermediate camming surface 252, and a clamping camming surface 254.

The camming surfaces 250, 252, 254 are selectively engageable with the clamp cleat 102 to selectively position the clamp cleat 102 and gage plate 90 relative to the cable 14. The open camming surface 250 engages the clamp cleat 102 to position the clamp cleat 102 in the open position. The intermediate camming surface 252 engages the clamp cleat 102 to urge the clamp cleat 102 upwardly to an intermediate position. In the intermediate position, the cable 14 disposed in the cable clamping passageway 40 is lightly engaged by both the clamp cleat 102 and adjustable cleat 100. Advantageously, when the cleats 100, 102 lightly engage the cable 14, the cleats 100, 102 maintain a slight tension in the cable 14 when the cable 14 is pulled through the cable clamping passageway 40, such as when the cable 14 is tightened around a machine being locked out. Finally, the clamping camming surface 254 urges the clamp cleat 102 to the clamping position to securely engage the clamp cleat upper surface 200 with the cable 14 disposed in the cable clamping passageway 40.

A transverse opening 222 formed through the cam body 248 receives the wrist pin 52 to pivotally mount the cam 216 relative to the cam mounting clip 208. The lever arm 220 is received in a slot 224 formed in the handle 50 to fix to the lever arm 220 relative to the handle 50, such that pivotal movement of the handle 50 from the handle open position to the handle clamping position pivots the cam 216 about the wrist pin 52 to selectively engage one of the camming surfaces 250, 252, 254 formed on the cam body 248 with the clamp cleat 102 to selectively position the clamp cleat 102 and gage plate 90 relative to the cable 14.

The cam mounting clip 208 shown in FIGS. 6-10 and 16 is a U-shaped metal frame having the guide leg 206 received in the slot 212 formed in the side 204 of the clamp cleat 102 and a guard leg 218. The guide leg 206 extends upwardly from the cam 216 past the clamp cleat 102 and the adjustable cleat 100. Advantageously, the guide leg 206 extends between the gage plate legs 160 to vertically guide the gage plate 90 between the open and sizing positions. A top end 228 of the guide leg 206 is joined to a top end 230 of the guard leg 218 by a top bar 232 extending over the adjustable cleat 100 beneath the cable sizing passageway 38, such that the legs 206, 218 extend downwardly from the top bar 232 on opposing sides of the adjustable cleat 100 to the cam 216. A hole 234 formed through each of the cam mounting clip legs 206, 218 proximal their distal ends receive the wrist pin 52 pivotally mounting the handle 50. The wrist pin 52 also extends through the cam 216 to pivotally mount the cam 216 for pivotal movement about the wrist pin 52. A guard 236 extending forwardly from the guard leg 218 of the cam mounting clip 208 protects the cable 14 disposed in the cable clamping passageway 40 from a loading lever 240 extending into the body 12 from the handle 50.

The loading lever 240 shown in FIGS. 6-10 and 15 extends into the body 12 from the handle 50, and is fixed to the handle 50 for pivotal movement about the wrist pin 52. Pivotal movement of the handle 50 from the clamping position to the open position engages the loading lever 240 with a post 242 extending transversely from the cleat plate 190 fixed to the adjustable cleat 100 to urge the adjustable cleat 100 toward the rearward position against the urging of the adjustable cleat biasing member 110 (shown in FIG. 5). Advantageously, as the adjustable cleat 100 is urged rearwardly, it moves diagonally upwardly along the diagonal track 116 to vertically move the gage plate 90 to the open position which allows the cable 14 to be loaded into the cable sizing passageway 38.

Referring now to FIGS. 1-10 and 14, in use, the handle 50 of the cable lockout assembly 10 is pivoted to its open position to clear the cable passageway 36 for insertion of the cable 14. Pivoting the handle 50 to the open position engages the loading lever 240 with the post 242 extending transversely from the cleat plate 190 to urge the adjustable cleat 100 toward the rearward position against the urging of the adjustable cleat biasing member 110. In the rearward position, the adjustable cleat 100 is spaced furthest away vertically upwardly from the cable clamping passageway 40 to clear the adjustable cleat 100 from the cable clamping passageway 40. As the adjustable cleat 100 is urged toward the rearward position, the gage plate 190 is urged upwardly out of the cable sizing passageway 38 by the adjustable cleat 100 to clear the cable sizing passageway 38. In addition, as the handle 50 is pivoted toward the open position, the cam 216 rotates about the wrist pin 52 which allows the clamp cleat biasing member 124 to urge the clamp cleat 102 downwardly out of the cable clamping passageway 40. As a result, the entire length of the cable passageway 36 is cleared for threading the cable 14 therethrough.

Once the cable passageway 36 is clear, a free end 72 of the cable 14 is threaded through the cable sizing passageway 38 of the cable lockout assembly 10 through the anchor receptacle 42 until the anchor 44 fixed to the opposing end of the cable 14 is received in the anchor receptacle 42. The free end 72 of the cable 14 is then threaded through one or more components of a machine to lock out the machine. Once the cable 14 is threaded through the machine, the free end 72 of the cable 14 is threaded through the cable clamping passageway 40, and pulled tight, as desired, to draw the cable lockout assembly 10 close to the machine being locked out. Advantageously, prior to pulling the cable 14 tight, the handle 50 can be rotated toward the clamping position, such that the intermediate camming surface 252 of the cam 216 engages the clamp cleat 102 and positions the clamp cleat 102 in the intermediate position to maintain tension in the cable 14 as the cable 14 is being pulled tight.

Once the cable 14 has been threaded through the entire cable passageway 36, the handle 50 is rotated toward the clamping position. As the handle 50 rotates toward the clamping position, the loading lever 240 allows the adjustable cleat biasing member 110 to urge the adjustable cleat 100 toward the forward position along the diagonal path until the gage plate engagement arm 156 engages the cable 14 disposed in the cable sizing passageway 38. Advantageously, once the gage plate engagement arm 156 engages the cable 14 disposed in the cable sizing passageway 38, the adjustable cleat 100 is prevented from further movement into the cable clamping passageway 40 by the coupling posts 162 extending from the gage plate legs 160 into the longitudinal slot 196 formed in the adjustable cleat side 176 to position the adjustable cleat 100 relative to the cable size, such that the cable clamping mechanism 18 applies a substantial force on the cable 14 regardless of the cable diameter.

As the handle 50 continues to rotate toward the clamped position, the cam 216 engages the clamp cleat 102, and urges the clamp cleat 102 toward the cable 14 disposed in the cable clamping passageway 40 to clamp the cable 14 between the adjustable cleat 100 and clamp cleat 102. Once the cable 14 is clamped in the cable clamping passageway 40, the holes 56 formed in the handle 50 are aligned with the holes 62 formed in the lock plate 60. The hasp of a padlock, or other locking mechanism, is then slipped through a pair of the aligned holes 56, 62 and locked to prevent an unauthorized user from releasing the cable 14.

While there has been shown and described what are at present considered the preferred embodiments of the invention, it will be obvious to those skilled in the art that various changes and modifications can be made therein without departing from the scope of the invention defined by the appended claims.

I claim:

1. A cable lockout assembly comprising:
    a body having a passageway therethrough;
    a cable received in said passageway;
    a cable sizing mechanism including a moveable gage plate, said moveable gage plate being moveably mounted in said body adjacent said passageway and engageable with the cable;
    a cable clamping mechanism including first and second moveable cleats, said first moveable cleat being moveably mounted in said body adjacent said passageway and coupled to said moveable gage plate to fix the position of said first moveable cleat in relation to a diameter of the cable, and said second moveable cleat being moveably mounted in said body adjacent said passageway opposing said first moveable cleat for clamping said cable between said first and second moveable cleats: and
    wherein, said passageway is discontinuous comprising first and second passageways, each of said first and second passageways extending through said body with a first portion of the cable extending through said first passageway and a second portion of the cable extending through said second passageway, and said moveable gage plate engaging the first portion of the cable and said first and second moveable cleats clamping said second portion of the cable.

2. The cable lockout assembly as in claim 1, in which said second moveable cleat has an open position and a closed position, in said open position, said second moveable cleat is disengaged from the cable allowing the cable to be fed through said passageway, and in said closed position, said second moveable cleat is urged into engagement with the cable to clamp the cable between said first and second moveable cleat.

3. The cable lockout assembly as in claim 2, in which said second moveable cleat includes an intermediate position interposed between said open and closed position to maintain tension on the cable fed through said passageway.

4. The cable lockout assembly as in claim 2, in which said second moveable cleat is urged into engagement with the cable by a cam engaging said second moveable cleat to urge said second moveable cleat into said passageway.

5. The cable lockout assembly as in claim 4, in which said cam is moved between an open position and a closed position by a lever fixed to said cam.

6. The cable lockout assembly as in claim 5, in which said lever includes a lever lockout aperture, and said body includes a body lockout aperture, wherein in said closed position, said lever lockout aperture and said body lockout aperture are aligned for receiving a lock.

7. The cable lockout assembly as in claim 5, in which said lever is pivotally fixed relative to said body.

8. The cable lockout assembly as in claim 1, in which a biasing member biases at least one of said first and second moveable cleats away from said passageway.

9. The cable lockout assembly as in claim 1, in which said moveable gage plate is moveable in a first direction, and said first moveable cleat is moveable in a second direction, wherein said first and second directions are not parallel.

10. The cable lockout assembly as in claim 1, wherein said cable sizing mechanism adjusts said cable clamping mechanism to apply a predetermined force on the cable regardless of the diameter of the cable.

11. A cable lockout assembly for use with a cable, said lockout assembly comprising:
    a body having a passageway;
    a cable received in said passageway;
    a cable sizing mechanism mounted relative to said body and being engageable with the cable;
    a cable clamping mechanism mounted relative to said body and coupled with said cable sizing mechanism for adjusting said cable clamping mechanism relative to a size of the cable; and
    wherein, said passageway is discontinuous comprising first and second passageways, each of said first and second passageways extending through said body with a first portion of the cable extending through said first passageway and a second portion of the cable extending through said second passageway, and said cable sizing mechanism engaging the first portion of the cable and said cable clamping mechanism clamping said second portion of the cable.

12. The cable lockout assembly as in claim 11, in which said cable clamping mechanism includes first and second moveable cleats, said first moveable cleat being moveably mounted in said body adjacent said passageway and engaging said cable sizing mechanism to fix the position of said first moveable cleat in relation to said size of the cable for engaging the cable, and said second moveable cleat being moveably mounted in said body adjacent said passageway opposing said first moveable cleat for engaging the cable.

13. The cable lockout assembly as in claim 12, in which said second moveable cleat has an open position and a closed position, in said open position, said second moveable cleat is disengaged from the cable allowing the cable to be fed through said passageway, and in said closed position, said second moveable cleat is urged into engagement with the cable to clamp the cable between said first and second moveable cleats.

14. The cable lockout assembly as in claim 13, in which said second moveable cleat includes an intermediate position interposed between said open and closed position to maintain tension on the cable fed through said passageway.

15. The cable lockout assembly as in claim 13, in which said second moveable cleat is urged into engagement with the cable by a cam engaging said second moveable cleat.

16. The cable lockout assembly as in claim 15, in which said cam is moved between an open position and a closed position by a lever fixed to said cam.

17. The cable lockout assembly as in claim 16, in which said lever includes a lever lockout aperture, and said body includes a body lockout aperture, wherein in said closed position, said lever lockout aperture and said body lockout aperture are aligned for receiving a lock.

18. The cable lockout assembly as in claim 16, in which said lever is pivotally fixed relative to said body.

19. The cable lockout assembly as in claim 12, in which a biasing member biases at least one of said first and second moveable cleats away from said passageway.

20. The cable lockout assembly as in claim 12, in which said cable sizing mechanism includes a moveable gage plate mounted in said body adjacent said passageway and engageable with the cable, said moveable gage plate being coupled with said first moveable cleat.

21. The cable lockout assembly as in claim 20, in which said moveable gage plate is moveable in a first direction, and said first moveable cleat is moveable in a second direction, wherein said first and second directions are not parallel.

22. The cable lockout assembly as in claim 11 wherein said cable sizing mechanism adjusts said cable clamping mechanism to apply a predetermined force on the cable regardless of the diameter of the cable.

* * * * *